United States Patent
Barry et al.

(10) Patent No.: US 10,460,704 B2
(45) Date of Patent: Oct. 29, 2019

(54) SYSTEMS AND METHODS FOR HEAD-MOUNTED DISPLAY ADAPTED TO HUMAN VISUAL MECHANISM

(71) Applicant: Linear Algebra Technologies Limited, Dublin (IE)

(72) Inventors: Brendan Barry, Dublin (IE); David Moloney, Dublin (IE)

(73) Assignee: Movidius Limited, Schiphol-Rijk (NL)

( * ) Notice: Subject to any disclaimer, the term of this patent is extended or adjusted under 35 U.S.C. 154(b) by 0 days.

(21) Appl. No.: 15/088,816

(22) Filed: Apr. 1, 2016

(65) Prior Publication Data

US 2017/0287447 A1 Oct. 5, 2017

(51) Int. Cl.
| | |
|---|---|
| G06T 15/00 | (2011.01) |
| G09G 5/391 | (2006.01) |
| G02B 27/01 | (2006.01) |
| G06F 3/01 | (2006.01) |
| G09G 5/00 | (2006.01) |
| H04N 19/597 | (2014.01) |

(Continued)

(52) U.S. Cl.
CPC .......... *G09G 5/391* (2013.01); *G02B 27/017* (2013.01); *G06F 3/013* (2013.01); *G09G 5/006* (2013.01); *H04N 13/344* (2018.05); *H04N 13/383* (2018.05); *H04N 13/398* (2018.05); *H04N 19/132* (2014.11); *H04N 19/167* (2014.11); *H04N 19/17* (2014.11); *H04N 19/426* (2014.11); *H04N 19/597* (2014.11); *G02B 2027/014* (2013.01); *G02B 2027/0132* (2013.01); *G09G 2340/0407* (2013.01); *G09G 2354/00* (2013.01); *G09G 2360/18* (2013.01)

(58) Field of Classification Search
CPC ................................ G06T 11/40; G06T 11/00
USPC .......................................................... 345/419
See application file for complete search history.

(56) References Cited

U.S. PATENT DOCUMENTS

| | | |
|---|---|---|
| 3,553,651 A | 1/1971 | Richard |
| 3,919,534 A | 11/1975 | Hutson et al. |

(Continued)

FOREIGN PATENT DOCUMENTS

| | | |
|---|---|---|
| CA | 1236584 A1 | 5/1988 |
| CN | 1078841 A | 11/1993 |

(Continued)

OTHER PUBLICATIONS

Stengel, M., Grogorick, S., Eisemann, M., Eisemann, E., & Magnor, M. A. (Oct. 2015). An affordable solution for binocular eye tracking and calibration in head-mounted displays. In Proceedings of the 23rd ACM international conference on Multimedia (pp. 15-24). ACM.*

(Continued)

*Primary Examiner* — Phu K Nguyen
(74) *Attorney, Agent, or Firm* — Hanley Flight & Zimmerman, LLC (57) ABSTRACT

Systems and methods are provided for rendering of a dual eye-specific display. The system tracks the user's eye movements and/or positions, in some implementations, based on electroencephalography (EEG) of the user, to correctly label the central (foveal) and peripheral (extra-foveal) areas of the display. Foveal data is fully rendered while extra-foveal data is reduced in resolution and, in some implementations, shared between the two displays.

20 Claims, 7 Drawing Sheets

(51) Int. Cl.
*H04N 19/132* (2014.01)
*H04N 19/17* (2014.01)
*H04N 19/167* (2014.01)
*H04N 19/426* (2014.01)
*H04N 13/344* (2018.01)
*H04N 13/383* (2018.01)
*H04N 13/398* (2018.01)

(56) References Cited

U.S. PATENT DOCUMENTS

| | | | |
|---|---|---|---|
| 4,281,312 A | 7/1981 | Knudson |
| 4,680,730 A | 7/1987 | Omoda et al. |
| 4,783,841 A | 11/1988 | Crayson |
| 4,850,027 A | 7/1989 | Kimmel |
| 5,081,573 A | 1/1992 | Hall et al. |
| 5,226,171 A | 7/1993 | Hall et al. |
| 5,262,973 A | 11/1993 | Richardson |
| 5,434,623 A | 7/1995 | Coleman et al. |
| 5,517,628 A | 5/1996 | Morrison et al. |
| 5,586,300 A | 12/1996 | Wilcox et al. |
| 5,861,873 A | 1/1999 | Kikinis |
| 5,963,642 A | 10/1999 | Goldstein |
| 5,968,167 A | 10/1999 | Whittaker et al. |
| 6,009,511 A | 12/1999 | Lynch et al. |
| 6,173,389 B1 | 1/2001 | Pechanek et al. |
| 6,243,806 B1 | 6/2001 | Koumura et al. |
| 6,252,989 B1 | 6/2001 | Geisler et al. |
| 6,275,921 B1 | 8/2001 | Iwata et al. |
| 6,304,605 B1 | 10/2001 | Haikonen et al. |
| 6,351,335 B1 | 2/2002 | Perlin |
| 6,366,999 B1 | 4/2002 | Drabenstott et al. |
| 6,467,036 B1 | 10/2002 | Pechanek et al. |
| 6,535,644 B1 * | 3/2003 | Kurapati ............. H04N 19/63 375/240.01 |
| 6,577,316 B2 | 6/2003 | Brethour et al. |
| 6,591,019 B1 | 7/2003 | Comair et al. |
| 6,760,831 B2 | 7/2004 | Drabenstott et al. |
| 6,839,728 B2 | 1/2005 | Pitsianis et al. |
| 6,851,041 B2 | 2/2005 | Pechanek et al. |
| 6,859,870 B1 | 2/2005 | Kim et al. |
| 6,948,087 B2 | 9/2005 | Brethour et al. |
| 6,954,842 B2 | 10/2005 | Drabenstott et al. |
| 7,010,668 B2 | 3/2006 | Drabenstott et al. |
| 7,038,687 B2 | 5/2006 | Booth, Jr. et al. |
| 7,050,068 B1 * | 5/2006 | Bastos ............... G06T 11/001 345/611 |
| 7,124,279 B2 | 10/2006 | Topham |
| 7,146,487 B2 | 12/2006 | Drabenstott et al. |
| 7,343,471 B2 | 3/2008 | Topham |
| 7,366,874 B2 | 4/2008 | Seong et al. |
| 7,395,297 B2 | 7/2008 | Steele, Jr. |
| 7,409,530 B2 | 8/2008 | Kim et al. |
| 7,424,594 B2 | 9/2008 | Pitsianis et al. |
| 7,474,308 B2 | 1/2009 | Deering |
| 7,502,918 B1 | 3/2009 | Barowski et al. |
| 7,884,823 B2 | 2/2011 | Bertolami et al. |
| 8,094,965 B2 * | 1/2012 | Shimizu ............... G06K 9/4619 382/275 |
| 8,200,594 B1 | 6/2012 | Bleiweiss |
| 8,538,886 B1 | 9/2013 | Iu et al. |
| 8,713,080 B2 | 4/2014 | Moloney |
| 9,030,583 B2 | 5/2015 | Gove et al. |
| 9,104,633 B2 | 8/2015 | Moloney |
| 9,146,747 B2 | 9/2015 | Moloney et al. |
| 9,196,017 B2 | 11/2015 | Donohoe et al. |
| 9,223,575 B2 | 12/2015 | Moloney |
| 9,270,872 B2 | 2/2016 | Donohoe |
| 9,690,099 B2 * | 6/2017 | Bar-Zeev ............. G02B 27/017 |
| 9,727,991 B2 * | 8/2017 | Guenter ............... G06T 11/40 |
| 9,905,046 B2 | 2/2018 | Janczak et al. |
| 10,109,039 B1 | 10/2018 | Ray et al. |
| 10,152,764 B2 | 12/2018 | Surti et al. |
| 2002/0158888 A1 | 10/2002 | Kitsutaka |
| 2003/0005261 A1 | 1/2003 | Sheaffer |
| 2003/0149822 A1 | 8/2003 | Scott et al. |
| 2003/0154358 A1 | 8/2003 | Seong et al. |
| 2004/0101045 A1 | 5/2004 | Yu et al. |
| 2004/0260410 A1 | 12/2004 | Sakamoto |
| 2005/0036707 A1 | 2/2005 | Matsuura |
| 2006/0023429 A1 | 2/2006 | Ribeiro et al. |
| 2007/0291571 A1 | 12/2007 | Balasundaram |
| 2008/0007562 A1 | 1/2008 | Stuttard et al. |
| 2008/0068389 A1 | 3/2008 | Bakalash et al. |
| 2008/0074515 A1 | 3/2008 | Takane |
| 2008/0259186 A1 | 10/2008 | Wang et al. |
| 2009/0080695 A1 | 3/2009 | Yang |
| 2010/0165144 A1 | 7/2010 | Lee |
| 2010/0302413 A1 | 12/2010 | Kawashima |
| 2011/0141326 A1 | 6/2011 | Ishida |
| 2012/0216019 A1 | 8/2012 | Bower et al. |
| 2012/0293677 A1 | 11/2012 | Ostrovsky |
| 2012/0314946 A1 | 12/2012 | Nomura et al. |
| 2012/0319928 A1 | 12/2012 | Rhodes |
| 2013/0116986 A1 | 5/2013 | Zhang et al. |
| 2014/0063283 A1 | 3/2014 | Chang et al. |
| 2014/0071309 A1 | 3/2014 | Price et al. |
| 2014/0184475 A1 | 7/2014 | Tantos et al. |
| 2014/0247277 A1 | 9/2014 | Guenter et al. |
| 2015/0277123 A1 | 10/2015 | Chaum et al. |
| 2017/0169602 A1 | 6/2017 | Blackmon et al. |
| 2019/0043167 A1 | 2/2019 | Steyskal et al. |

FOREIGN PATENT DOCUMENTS

| | | |
|---|---|---|
| CN | 1326132 A | 12/2001 |
| CN | 101086680 A | 12/2007 |
| DE | 69228442 T2 | 9/1999 |
| DE | 69519801 T2 | 6/2001 |
| DE | 69709078 T2 | 10/2002 |
| DE | 102007025948 A1 | 1/2008 |
| EP | 0240032 A2 | 10/1987 |
| EP | 0245027 A2 | 11/1987 |
| EP | 1158401 A2 | 11/2001 |
| EP | 1241892 A1 | 9/2002 |
| ES | 2171919 T3 | 9/2002 |
| FI | 97096 B | 6/1996 |
| FR | 2835934 A1 | 8/2003 |
| GB | 0710876 A | 6/1954 |
| GB | 1488538 A | 10/1977 |
| GB | 2311882 A | 10/1997 |
| GB | 2348971 A | 10/2000 |
| GB | 2362055 A | 11/2001 |
| GB | 2362733 A | 11/2001 |
| GB | 2366643 A | 3/2002 |
| JP | 03042969 B2 | 5/2000 |
| JP | 2002/007211 A | 1/2002 |
| JP | 2008-277926 A | 11/2008 |
| WO | WO-9313628 A1 | 7/1993 |
| WO | WO-96/08928 A1 | 3/1996 |
| WO | WO-9738372 A1 | 10/1997 |
| WO | WO-0022503 A1 | 4/2000 |
| WO | WO-0034887 A1 | 6/2000 |
| WO | WO-0045282 A1 | 8/2000 |
| WO | WO-01/43074 A1 | 6/2001 |
| WO | WO-0184849 A1 | 11/2001 |
| WO | WO-2002/051099 A2 | 6/2002 |
| WO | WO-2005/091109 A1 | 9/2005 |
| WO | WO-2008010634 A1 | 1/2008 |
| WO | WO-2008/087195 A1 | 7/2008 |
| WO | WO-2009101119 A1 | 8/2009 |
| WO | 2010/062481 | 6/2010 |
| WO | 2016/094963 | 6/2016 |
| WO | 2016/102355 | 6/2016 |
| WO | 2016/102365 | 6/2016 |

OTHER PUBLICATIONS

International Searching Authority, "Search Report", issued in connection with PCT patent application No. PCT/IB2017/000283, dated Jun. 26, 2017, 6 pages.

(56) References Cited

OTHER PUBLICATIONS

International Searching Authority, "Written Opinion", issued in connection with PCT patent application No. PCT/IB2017/000283, dated Jun. 26, 2017, 9 pages.
Hillaire et al., "Depth-of-Field Blur Effects for First-Person Navigation in Virtual Environments", Proceedings of the 2007 ACM Symposium on Virtual Reality Software Andtechnology, New York, NY—ACM Press, Nov. 5, 2007, 4 pages.
Alexander, J., "Evolution and use of the VME subsystem bus—VSB," Microprocessors and Microsystems, vol. 10, No. 6, pp. 307-312 (Jul./Aug. 1986).
Atoofian, E. and Baniasadi, A., "Improving Energy-Efficiency by Bypassing Trivial Computations," IEEE International Conference on Parallel and Distributed Processing Symposium, 7 pages (Apr. 4-8, 2005).
Atoofian, E. and Baniasadi, A., "Improving Energy-Efficiency in High-Performance Processors by Bypassing Trivial Instructions," IEE-Proc. Comput. Digit. Tech., vol. 153, No. 5, pp. 313-322 (Sep. 6, 2006).
Guenter, et al., "Foveated 3D Graphics and Supplement to Foveated 3D Graphics: User Study Details," Microsoft Corporation, 14 pages (Nov. 20, 2012).
International Preliminary Report on Patentability issued by the European Patent Office for PCT/EP2011/050189 dated Jul. 10, 2012 (5 pages).
International Search Report and Written Opinion issued by the European Patent Office as International Searching Authority for International Application No. PCT/EP2008/053133 dated May 14, 2008 (7 pages).
International Search Report and Written Opinion issued by the European Patent Office as International Searching Authority for International Application No. PCT/EP2008/053134 dated May 21, 2008 (9 pages).
International Search Report and Written Opinion issued by the European Patent Office as International Searching Authority for International Application No. PCT/IB2014/002541 dated Jul. 20, 2015 (14 pages).
International Search Report and Written Opinion issued by the European Patent Office as International Searching Authority for International Application No. PCT/IB2014/003059 dated May 11, 2015 (10 pages).
International Search Report and Written Opinion issued by the U.S. Patent and Trademark Office as International Searching Authority for International Application No. PCT/IB14/03104 dated Jun. 25, 2015 (10 pages).
Islam, M. and Stenstrom, P., "Reduction of Energy Consumption in Processors by Early Detection and Bypassing of Trivial Operations," IEEE Conference on Embedded Computer Systems: Architectures, Modeling and Simulation, 7 pages (Jul. 17-20, 2006).
McCloud, et al., "A Floating Point Unit for the 68040" IEEE International Conference on Computer Design: VLSI in Computers and Processors, pp. 187-190 (Sep. 17-19, 1990).
No Author Listed, "ARM Architecture Reference Manual," ARMv7-A and ARMv7-R edition, 2734 pages (1996-1998, 2000, 2004-2012).
No Author Listed, "Cortex-A8," Revision r3p2, Technical Reference Manual, 580 pages (2006-2010).
No Author Listed, "Cortex-A9 NEON Media Processing Engine," Revision r3p0, Technical Reference Manual, 49 pages (2008-2011).
No Author Listed, "FOVE: The World's First Eye Tracking virtual reality headset," retrieved online from URL: http://www.getfove.com/, 9 pages (retrieved online Aug. 24, 2016).
No Author Listed, "i.MX 6Dual/6Quad Applications Processor Reference Manual," Rev. 2, 5817 pages (Jun. 2014).
No Author Listed, "MSC8256 Reference Manual," Six Core Digital Signal Processor, Rev. 0, 1272 pages (Jul. 2011).
No Author Listed, "SC140 DSP Core Reference Manual," Rev. 3, 712 pages (Nov. 2001).
Pooch, U. W. and Neider, A., "A Survey of Indexing Techniques for Sparse Matrices," Computing Surveys vol. 5, No. 2, pp. 109-133 (Jun. 1973).
Richardson, S.E., "Exploiting Trivial and Redundant Computation," IEEE, Sun Microsystems Laboratories, Inc., pp. 220-227 (1993).
Rosten, et al., "Machine learning for high-speed corner detection," Department of Engineering, Cambridge University, UK, 14 pages (2006).
Salomon, D., "Data Compression the Complete Reference," New York, NY Springer, US, pp. 6-10, 11 pages (Jan. 1, 1998).
Williamson, D., "ARM Cortex A8: A High Performance Processor for Low Power Applications," 23 pages, In Unique chips and systems (Eugene John, Juan Rubio, eds.) Boca Raton: CRC Press (2008).
Yi, J. and Lilja, D., "Improving Processor Performance by Simplifying and Bypassing Trivial Computations", IEEE International Conference on Computer Design: VLSI in Computers and Processors, 10 pages (Sep. 18, 2002).
Brettle et al., "Stereo Rendering: An Overview", 2005, 7 pages.
Candy et al., "Optical, receptoral, and retinal constraints on foveal and peripheral vision in the human neonate", 1997, 14 pages.
Guenter et al., "Foveated 3D Graphics", 2012, 10 pages.
Patney et al., "Towards Foveated Rendering for Gaze-Tracked Virtual Reality", Dec. 5, 2016, 12 pages.
Liu et al. "Design of a foveated imaging system using a two-axis MEMS mirror", 2006, 8 pages.
Duchowski, "A breadth-first survey of eye-tracking applications", 2002, 16 pages.
Phillips et al., "Adaptive foveated single-pixel imaging with dynamic supersampling," http://advances.sciencemag.org/, Science Advances Magazine, Apr. 21, 2017, 11 pages.
Gonzalez et al., "Data-Driven Multiresolution Camera Using the Foveal Adaptive Pyramid", www.mdpi.com/journal/sensors, Sensors 2016, 27 pages.
Wikipedia, "Peripheral Vision," [https://en.wikipedia.org/w/index.php?title=Peripheral_vision&oldid=855400052], last apdated Aug. 18, 2018, 5 pages.
Patney et al, "Towards Foveated Rendering for Gaze-Tracked Virtual Reality," [http://cwyman.org/papers/siga16_gazeTrackedFoveatedRendering.pdf], ACM Transactions on Graphics, vol. 35, No. 6, Article 179, Nov. 2016, 12 pages.
Weier et al, "Foveated Real-Time Ray Tracing for Head-Mounted Displays," Computer Graphics Forum, 289-298, vol. 35, No. 7, 2016, 11 pages.
Guenter et al., "Foveated 3D Graphics," [https://www.microsoft.com/en-us/research/wp-content/uploads/2012/11/foveated_final15.pdf], ACM SIGGRAPH Asia, Nov. 2012, 10 pages.
United States Patent and Trademark Office, "Non-Final Office Action," issued in connection with U.S. Appl. No. 15/858,678, dated Feb. 14, 2019, 11 pages.

\* cited by examiner

SYSTEMS AND METHODS FOR HEAD-MOUNTED DISPLAY ADAPTED TO HUMAN VISUAL MECHANISM

FIELD OF THE APPLICATION

This present application relates generally to computer vision processing, and more specifically, to efficient image simulation in a head mounted display.

BACKGROUND

Continued advances in the speed and acuity of computers, particularly as related to graphics hardware and software, have recently made practical decades-old aspirations regarding immersive computer-generated environments. Virtual reality devices, with limb-tracking, haptic feedback, and head-mounted sensory equipment, are now being developed for consumer use. As cutting-edge systems attempt to provide more impressive and realistic artificial environments, the demands on the graphical systems remain intensive. In addition, efficient rendering and display, both in hardware and software, remain of paramount importance.

Advances in computer graphics and image technology have resulted in a new generation of head-mounted display devices with the intent to provide as realistic of a visual experience as possible for the user. The typical approach for these devices is to use conventional LCD display panels backed by frame-buffers that represent each pixel in the output frame.

This approach is wasteful in terms of power and area as it doesn't take account of the human visual system. The human retina has a high resolution at the center or fovea, a small region which is packed densely with photoreceptors and responsible for half the nerve fibers in the optic nerve. The rest of the retina provides lower resolution with a reduced density of photoreceptors. The human visual system gives the illusion of uniform high resolution by scanning the fovea around the scene and maintaining an internal mental model of the scene in the visual cortex.

SUMMARY

In accordance with the disclosed subject matter, systems and methods are provided for rendering of a dual eye-specific display. Recognizing the resolution limits of extra-foveal human vision provides an opportunity for resource savings by minimizing resources spent on extra-foveal rendering. The system tracks the user's eye movements and/or positions, in some implementations, based on electroencephalography (EEG) of the user, to correctly label the central (foveal) and peripheral (extra-foveal) areas of the display. Foveal data is fully rendered while extra-foveal data is reduced in resolution and, in some implementations, shared between the two displays.

In accordance with the disclosed subject matter, systems and methods are provided for a head-mounted display adapted to human visual mechanism. In one embodiment, the disclosure relates to a head-mounted display device with eye-tracking of a user's two eyes. The device comprises a first display for the left eye and a second display for the right eye. The device may further comprise a memory, coupled to the first display and the second display. The memory may comprise a first frame buffer for the first display and a second frame buffer for the second display, and the first frame buffer may comprise a first foveal frame buffer and a first extra-foveal frame buffer and the second frame buffer may comprise a second foveal frame buffer and a second extra-foveal frame buffer. The device may further comprise one or more processors, coupled to the memory. The one or more processors may be configured to receive eye-tracking information of the user wearing the head mounted display. The eye-tracking information may comprise at least one of an eye movement and an eye position of the user. The one or more processors may be further configured to determine, based on the eye-tracking information, a first foveal region of the first display, a first extra-foveal region of the first display, a second foveal region of the second display, and a second extra-foveal region of the second display. The one or more processors may be further configured to load, into the memory, first foveal region pixels of the first foveal region, first extra-foveal region pixels of the first extra-foveal region, second foveal region pixels of the second foveal region, second extra-foveal region pixels of the second extra-foveal region. The first foveal region pixels may be represented with full resolution and loaded into the first foveal frame buffer. The first extra-foveal region pixels may be represented with reduced resolution and loaded into the first extra-foveal frame buffer. The second foveal region pixels may be represented with full resolution and loaded into the second foveal frame buffer. The second extra-foveal region pixels may be represented with reduced resolution and loaded into the second extra-foveal frame buffer.

In accordance with other aspects of this embodiment, the eye-tracking information may be based on infrared light projection onto the user's eyes, either directly or obliquely.

In accordance with other aspects of this embodiment, the eye-tracking information may be based on electroencephalography (EEG) of the user.

In accordance with other aspects of this embodiment, at least one of the first foveal region, the first extra-foveal region, the second foveal region, or the second extra-foveal region is adjustable In accordance with other aspects of this embodiment, to represent the first extra-foveal region pixels and the second extra-foveal region pixel in reduced resolution, the one or more processors may be configured to duplicate a pixel value.

In accordance with other aspects of this embodiment, the one or more processors may be further configured to duplicate the pixel value across at least one of 2×2 pixels, 3×3 pixels, 4×4 pixels, or 5×5 pixels.

In accordance with other aspects of this embodiment, the device may further comprise a Display Serial Interface coupled to the memory and at least one of the first display or the second display. The one or more processors may be configured to duplicate the pixel value after receiving the pixel value from the Display Serial Interface.

In accordance with other aspects of this embodiment, the device may further comprise a plurality of Display Serial Interfaces. Some of the plurality of Display Serial Interfaces are configured to transfer, in parallel, display data corresponding to at least one of the first foveal region or the second foveal region.

In accordance with other aspects of this embodiment, the first extra-foveal frame buffer and the second extra-foveal frame buffer may be shared.

In accordance with other aspects of this embodiment, the one or more processors may be further configured to load the first foveal frame buffer and the first extra-foveal frame buffer at different rates and the second foveal frame buffer and the second extra-foveal frame buffer at different rates.

In accordance with other aspects of this embodiment, the one or more processors may be further configured to apply alpha-blending between depth-planes of the first foveal region pixels and depth-planes of the first extra-foveal region pixels and between depth-planes of the second foveal region pixels and depth-planes of the second extra-foveal region pixels.

In another embodiment, the disclosure relates to a method for a head-mounted display device with eye-tracking of a user's two eyes. According to the method, eye-tracking information of the user wearing the head-mounted display may be received. The eye-tracking information may comprise at least one of an eye movement and an eye position of the user. Based on the eye-tracking information, a first foveal region of a first display for the left eye, a first extra-foveal region of the first display, a second foveal region of a second display for the right eye, and a second extra-foveal region of the second display may be determined. First foveal region pixels that are represented with full resolution of the first foveal region may be loaded into a first foveal frame buffer of a first frame buffer for the first display. First extra-foveal region pixels that are represented with reduced resolution of the first extra-foveal region may be loaded into a first extra-foveal frame buffer of the first frame buffer for the first display. Second foveal region pixels that are represented with full resolution of the second foveal region may be loaded into a second foveal frame buffer of a second frame buffer for the second display. Second extra-foveal region pixels that are represented with reduced resolution of the second extra-foveal region may be loaded a second extra-foveal frame buffer of the second frame buffer for the second display.

In still another embodiment, the disclosure relates to a non-transitory computer readable medium storing a computer-readable program for a head-mounted display device with eye-tracking of a user's two eyes. The program may include computer-readable instructions to receive eye-tracking information of the user wearing the head mounted display. The eye-tracking information may comprise at least one of an eye movement and an eye position of the user. The program may include computer-readable instructions to determine, based on the eye-tracking information, a first foveal region of a first display for the left eye, a first extra-foveal region of the first display, a second foveal region of a second display for the right eye, and a second extra-foveal region of the second display. The program may include computer-readable instructions to load, into a first foveal frame buffer of a first frame buffer for the first display, first foveal region pixels that are represented with full resolution of the first foveal region. The program may include computer-readable instructions to load, into a first extra-foveal frame buffer of the first frame buffer for the first display, first extra-foveal region pixels that are represented with reduced resolution of the first extra-foveal region. The program may include computer-readable instructions to load, into a second foveal frame buffer of a second frame buffer for the second display, second foveal region pixels that are represented with full resolution of the second foveal region. The program may include computer-readable instructions to load, into a second extra-foveal frame buffer of the second frame buffer for the second display, second extra-foveal region pixels that are represented with reduced resolution of the second extra-foveal region.

The present invention will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

DESCRIPTION OF DRAWINGS

Various objects, features, and advantages of the disclosed subject matter can be more fully appreciated with reference to the following detailed description of the disclosed subject matter when considered in connection with the following drawings, in which like reference numerals identify like elements. The accompanying figures are schematic and are not intended to be drawn to scale. For purposes of clarity, not every component is labelled in every figure. Nor is every component of each embodiment of the disclosed subject matter shown where illustration is not necessary to allow those of ordinary skill in the art to understand the disclosed subject matter.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

The present invention makes use of a head-mounted display with eye-tracking. Display panels backed with frame-buffers are used to render each pixel in the output frame. Eye/pupil movement and/or position is measured and the information is fed to a frame-buffer manager to control the loading of the frame-buffer, as well as control the representation of the data in the frame-buffer. In the foveal region, pixels are represented with the full precision, while in the extra-foveal region, compromises in detail are made to increase efficiency.

Extra-foveal rendering techniques may include reduced resolution, reduced frame rate, and duplication between the two displays. Notably, these techniques are applied to the region identified as peripheral (extra-foveal) while the central (foveal) region of each display includes more detailed rendering.

Where an intelligent panel is used rather than duplicating pixels at the output of the frame-buffer in the extra-foveal region of the display, the compressed representation can be transmitted across the interface, thus saving power. The logic required to duplicate pixels can then be provided on the output of the DSI receiver.

Figure 1:
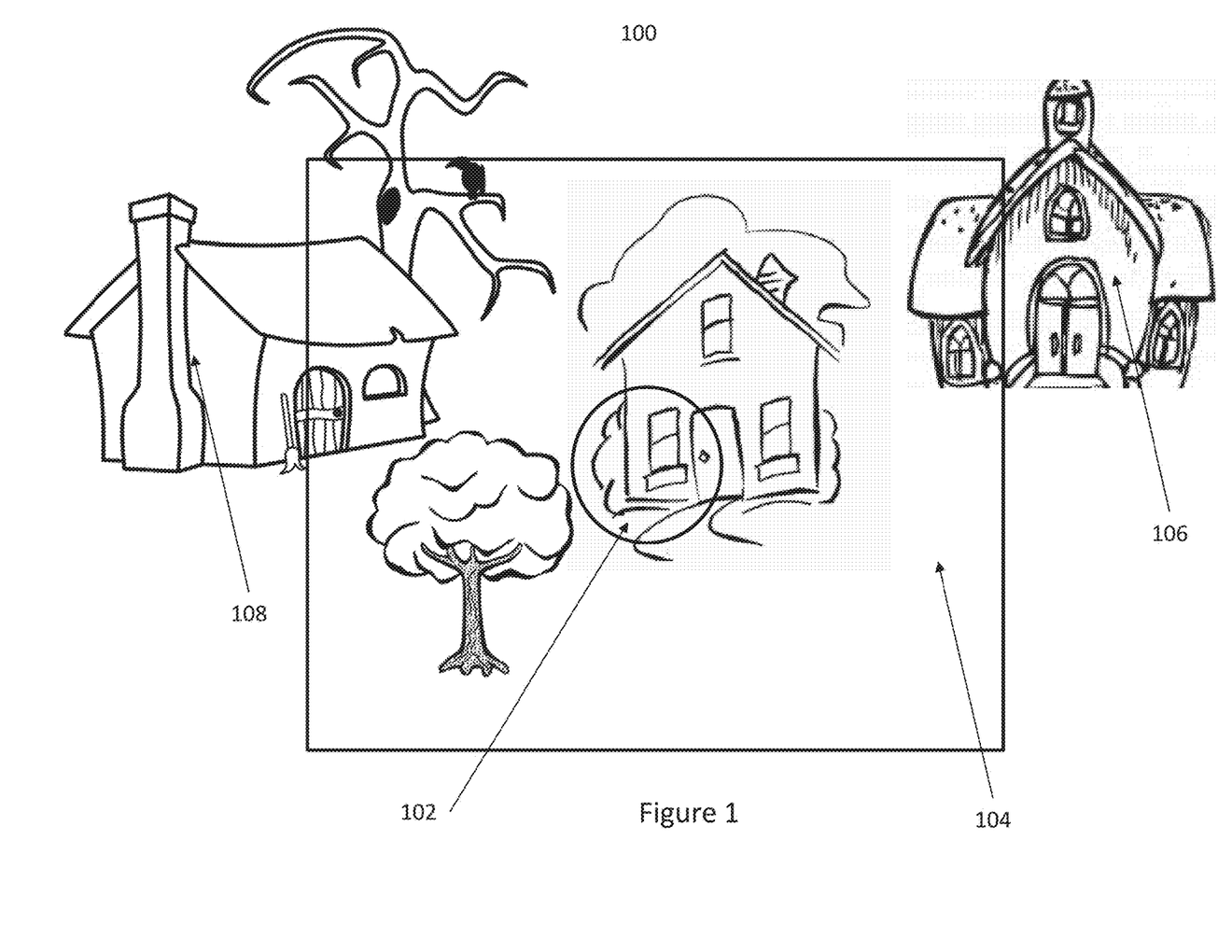
FIG. 1 illustrates an example scene with a foveal region and an extra-foveal region.

FIG. 1 illustrates an example scene with a foveal region and an extra-foveal region. Region 100 represents an example scene. Region 100 may be an image of a virtual reality scene. Region 104 represents an extra-foveal region. As described above, this portion of visual field projects to the retina region of reduced receptors and ganglion density. A human may see this portion with low resolution. Region 104 may be a portion within region 100. Humans may typically see about 135 degrees vertically and 160 degrees horizontally. Accordingly, portions of objects 106 and 108 may not be rendered in a virtual reality image for a user. Region 102 represents a foveal region. This portion of the visual field (e.g., a 5 or other degree central circle) projects to the retinal region called the fovea, tightly packed with color cone receptors. As described above, region 102 is a region where a user may see with great detail.

Figure 2:
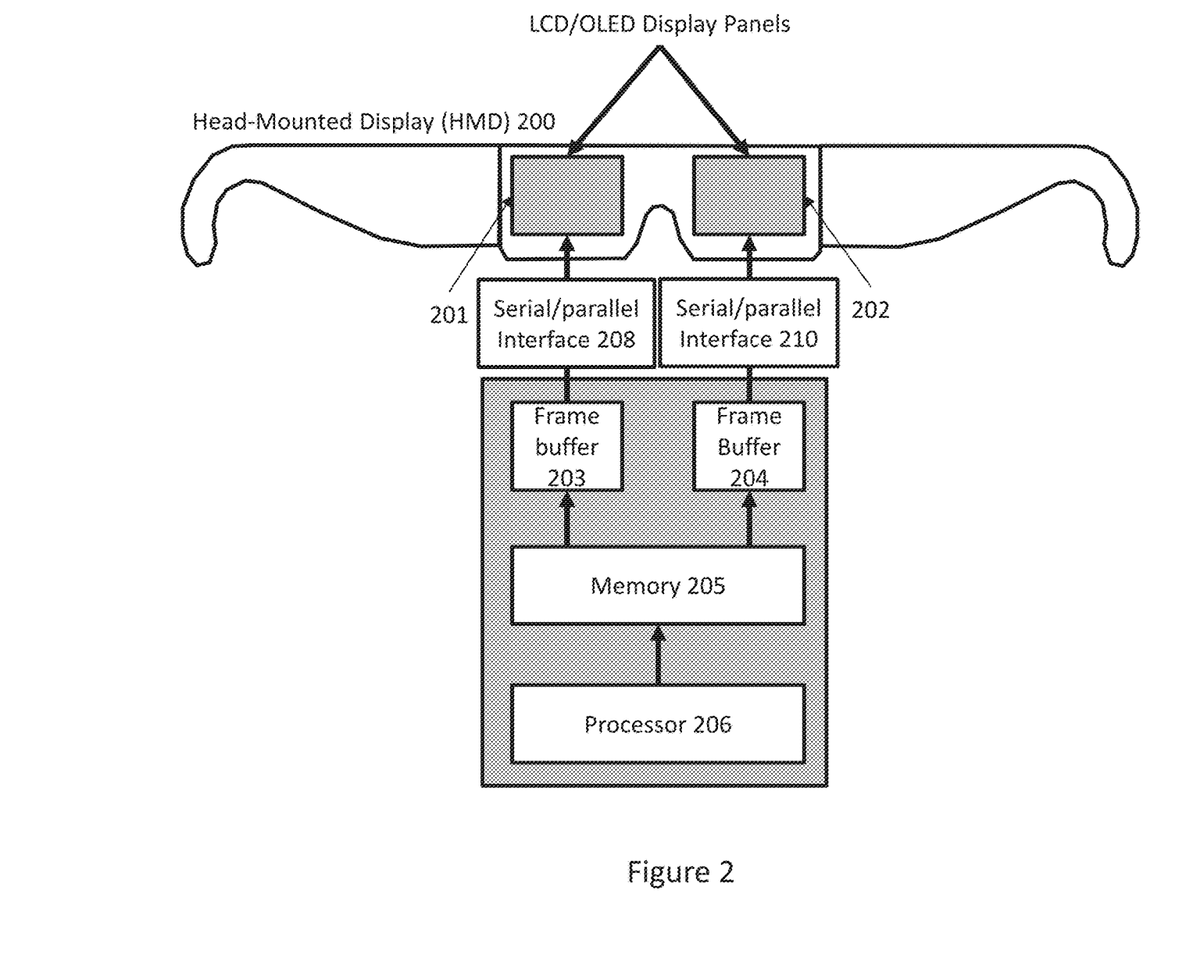
FIG. 2 illustrates a head-mounted display in an example state-of-the art implementation.

FIG. 2 illustrates a head-mounted display in an example state-of-the-art implementation. In FIG. 2, a state of the art head-mounted display is shown where images to be interpreted by the left and right eyes of the observer are output at full pixel resolution from a pair of display buffers. As shown in FIG. 2, a head-mounted display 200 comprises a display panel 201 for a user's left eye, a display panel 202 for the user's right eye, a frame buffer 203 which is connected to the display panel 202 via a serial/parallel interface 208, a frame buffer 204 which is connected to the display panel 202 via a serial/parallel interface 210, a memory 205 which comprises the frame buffer 203 and the frame buffer 204, and a processor 206 which may control the loading of pixels/image data into the frame buffers 203/204. In this embodiment, all pixels for the display panels 201 and 202 are rendered with the same resolution. In some embodiments, all pixels for display panels 201 and 202 are rendered with full resolution. One disadvantage of this method is that the amount of data memory required to store the pixels to be output to the two displays is large, especially where the resolution of these displays is climbing rapidly towards 4 k and beyond. Another disadvantage is that since a large amount of data is transmitted via the serial/parallel interfaces 208/210, transmission via the serial/parallel interfaces 208/210 may become a performance bottleneck.

Figure 3:
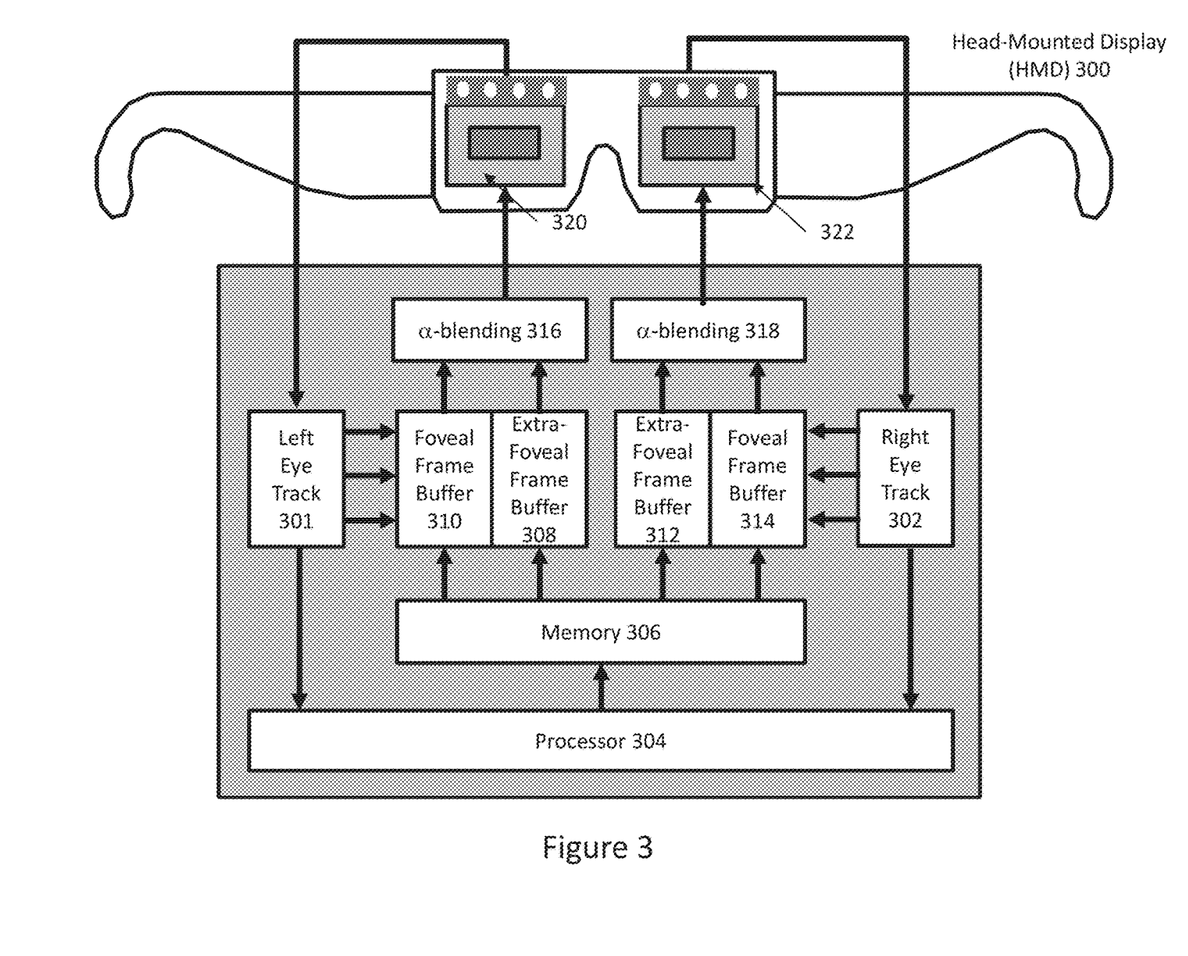
FIG. 3 is a block diagram illustrating an improved head-mounted display design, in accordance with an embodiment of the present disclosure.

FIG. 3 is a block diagram illustrating an improved head-mounted display design with separate left and right foveal display and lower resolution extra-foveal display buffers combined with alpha-blending where each buffer is controlled by eye tracking using at least one of infrared projection and detection or EEG-based eye-tracking, in accordance with an embodiment of the present disclosure. As shown in FIG. 3, a head-mounted display 300 comprises devices 301/302 that are used to track the eye movements and/or positions of the user who is wearing the head-mounted display. In some embodiments, the devices 301/302 project infrared lights onto the user's eyes to track the user's eye movements and positions. In some embodiments, the devices use cameras to take pictures or videos of the user's eyes. In other embodiments, the devices 301/302 detect electroencephalogram of the user to track user's eye movements and/or positions. The devices 301/302 may track and record brain wave patterns. For example, the user may have electrodes attached to his/her scalp, which then send signals to a processor 304 to record signals and detect movements and/or positions of the user's eyes (e.g., detect movements and/or positions of the pupils). In some embodiments, a user's eye movements and positions are tracked based on both infrared light tracking and EEG tracking. In other words, both results are combined to more accurately detect user's eye movements and/or positions. Based on the eye tracking information, the processor 304 may load into memory 306 images that correspond to what a user may see. In one embodiment, pixels that correspond to the extra-foveal region of the user's left eye are loaded into an extra-foveal frame buffer 308 and are loaded with lower resolution (e.g., lower resolution compared to original resolution of available image data). Pixels that correspond to the foveal region of the user's left eye are loaded into a foveal frame buffer 310 and are loaded with full resolution (e.g., original full resolution of available image data). Pixels that correspond to the extra-foveal region of the user's right eye are loaded into an extra-foveal frame buffer 312 and are loaded with lower resolution. Pixels that correspond to the foveal region of the user's right eye are loaded into a foveal frame buffer 314 and are loaded with full resolution.

In some embodiments, alpha blending 316/318 is applied to pixels in respective frame buffers 308/310/312/314 to create the appearance of partial or full transparency. Alpha blending is used to display an alpha bitmap, which is a bitmap that has transparent or semi-transparent pixels. In addition to a red, green, and blue color channel, each pixel in an alpha bitmap has a transparency component known as its alpha channel. The alpha channel typically contains as many bits as a color channel. For example, an 8-bit alpha channel can represent 256 levels of transparency, from 0 (the entire bitmap is transparent) to 255 (the entire bitmap is opaque).

Display panels 320/322 may display images comprising lower resolution and full resolution pixels.

In some embodiments, as described in relation to FIG. 1, the visual field of an extra-foveal region projects to the retina region of reduced receptors and ganglion density. A human may see this portion with low resolution. The visual field of an foveal region projects to the retinal region called the fovea, tightly packed with color cone receptors. A human may see this portion with high resolution. The foveal region may be a 5 or other degree central circle. Humans may typically see about 135 degrees vertically and 160 degrees horizontally. The extra-foveal region may be outside the foveal region and within 135 degrees vertically and 160 degrees horizontally. In some embodiments, the extents of the foveal region and/or the extra-foveal region may be determined empirically and/or programmable via registers in hardware. In other words, the foveal region and/or the extra-foveal region may not need to be determined at design time. Hardware may be designed such that the foveal region can extend to the entire visible field, which may be the worst-case. In some embodiments, software may be implemented which controls the registers that determine the extent of the foveal and extra foveal regions and/or their relative frame rates.

In some embodiments, the system may gradually test and adjust the foveal region to a point where the user is happy (e.g., it doesn't degrade the user experience). In other embodiments, the foveal region may be automatically adjusted, for example, to conserve battery energy. It may be better to have some display rather than no display because the battery is depleted.

For example, in a virtual reality application, where all image data are already available (e.g., a gaming virtual reality application that has all image data available), pixels that correspond to the foveal region(s) are loaded into foveal frame buffer(s) with full resolution (i.e., original resolution of the available image data). Pixels that correspond to the extra-foveal regions(s) are loaded into extra-foveal frame buffer(s) with reduced resolution. For example, as described in detail below, not all pixels from the available image data are loaded into an extra-foveal frame buffer. Rather, for example, for each 3×3 pixels of the available image data that correspond to an extra-foveal region, only one pixel is loaded into the extra-foveal frame buffer, and the value of that pixel is duplicated to its neighboring 8 pixels. In other words, the size of the pixel has been increased and the resolution has been reduced. In some embodiments, reduced resolution is resolution that is lower than the original full resolution.

Resolution and/or frame-rate of the foveal region may be different than that of the extra-foveal region. In some embodiments, the extra-foveal region may be represented with at lower resolution and/or lower frame-rate.

In some embodiments, multiple Display Serial Interfaces may be used in parallel. Some of the Display Serial Interfaces may be configured to transfer, in parallel, display data corresponding to the foveal region at relatively higher frame rate and/or resolution as compared to the extra-foveal data which can be transmitted at relatively lower frame rate and/or resolution. Some of the Display Serial Interfaces may be configured to transfer, in parallel, display data corresponding to the extra-foveal region.

In some implementations, pixel resolutions are represented in various (e.g., more than two) resolutions. For example, pixels for the foveal region (e.g., a 5 or other degree central circle) may be represented with full resolution (e.g., original full resolution of available image data.) Pixels for the extra-foveal region that are close to the foveal region may be represented with medium resolution, which may be just slightly lower resolution than the full resolution. And pixels for the extra-foveal region that are not close to the foveal region (e.g., a peripheral portion or an edge of the image) may be represented with lower resolution, which may be lower resolution compared to the medium resolution.

In some implementations, the processor 304 can be a general purpose processor executing computer executable instructions stored on a tangible computer readable medium. In some implementations, the processor 304 can be or can include special purpose circuitry such as an application-specific integrated circuit (ASIC) or a field-programmable gate array (FPGA). In some implementations, the processor 304 is part of hardware for accelerated graphics processing. In some implementations, the processor 304 is a system on a chip—an integrated circuit (IC) that integrates all components of a computer or other electronic system into a single chip. The processor 304 may integrate all components to enable efficient graphics processing and loading of frame buffers.

In some implementations, for the extra-foveal frame buffers 308/312, pixel values are duplicated across 2×2 pixels, 3×3 pixels, 4×4 pixels, 5×5 pixels, or other multiple pixels. In other words, rather than loading each pixel into the extra-foveal frame buffers 308/312, the processor 304 may load a subset of pixels that correspond to extra-foveal regions into the extra-foveal frame buffer 308/312, and duplicate a pixel value as its neighbor pixel values and store in the extra-foveal frame buffers. In some embodiments, extra-foveal frame buffers 308/312 and foveal frame buffers 310/314 are loaded with different rates (e.g., different frame rates). For example, extra-foveal frame buffers 308/312 may be loaded at 60 Hz and foveal frame buffers 310/314 may be loaded at 120 Hz. The extra-foveal frame buffers 308/312 and the foveal frame buffers 310/314 may be loaded at any other suitable rates.

In some implementations, display panels 320/322 may be LCD panels, LED panels, or display panels using other display technologies.

Figure 4:
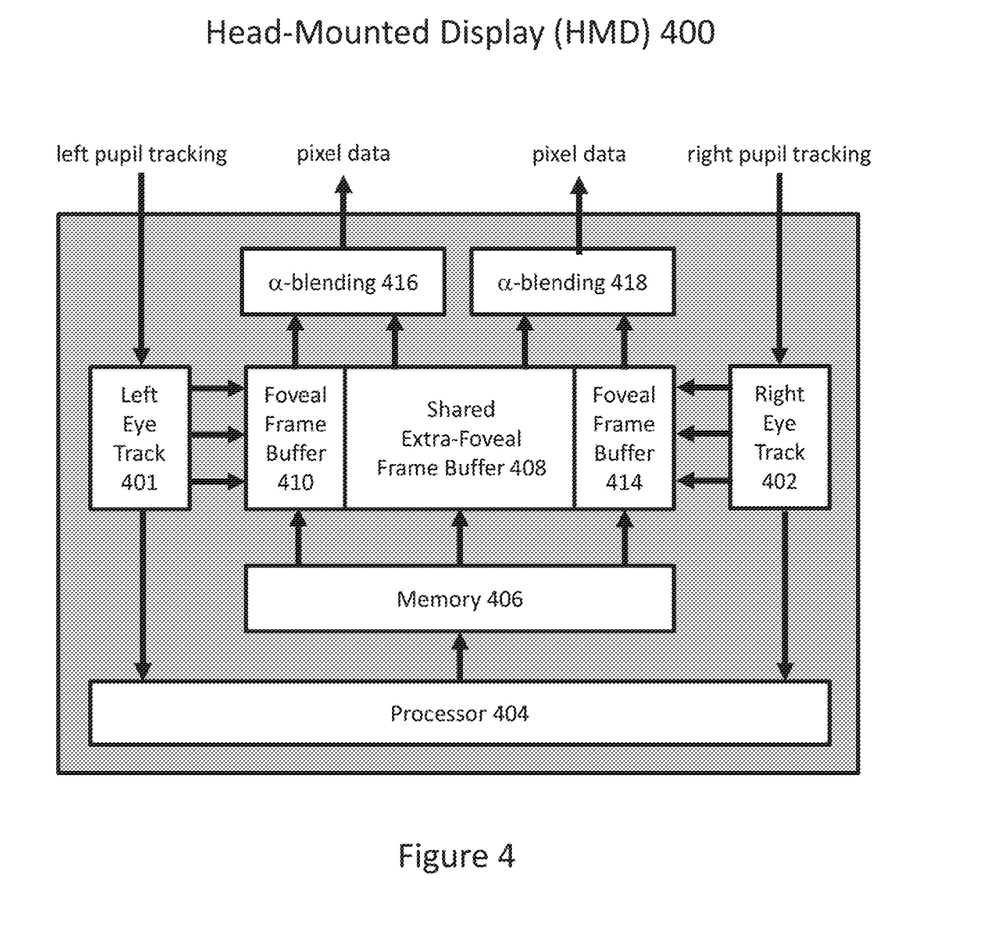
FIG. 4 is a block diagram illustrating an improved head-mounted display design, in accordance with an embodiment of the present disclosure.

FIG. 4 is a block diagram illustrating an improved head-mounted display design with separate full resolution left and right foveal frame buffer and shared lower resolution extra-foveal frame buffer, in accordance with an embodiment of the present disclosure. A head-mounted display 400 comprises eye track devices 401/402, a processor 404, a memory 406, foveal frame buffers 410/414, a shared extra-foveal frame buffer 408, and alpha-blending 416/418. The eye track devices 401/402, the processor 404, the memory 406, the foveal frame buffers 410/414, the shared extra-foveal frame buffer 408, and the alpha-blending 416/418 are similar to the eye track devices 301/302, the processor 304, the memory 306, the foveal frame buffers 310/314, and the alpha-blending 316/318 in FIG. 3. As shown in FIG. 4, rather than using two separate extra-foveal frame buffers (one extra-foveal frame buffer for the display panel for the left eye, and another extra-foveal frame buffer for the display panel for the right eye), in this embodiment, the extra-foveal frame buffer is shared between the two display panels. In other words, a pixel that corresponds to a unit of image data for the extra-foveal region may be allocated a single corresponding memory space, rather than one memory space for the display panel for the left eye, and another memory space for the display panel for the right eye. The shared extra-foveal frame buffer 410 may reduce the memory space requirement.

Figure 5:
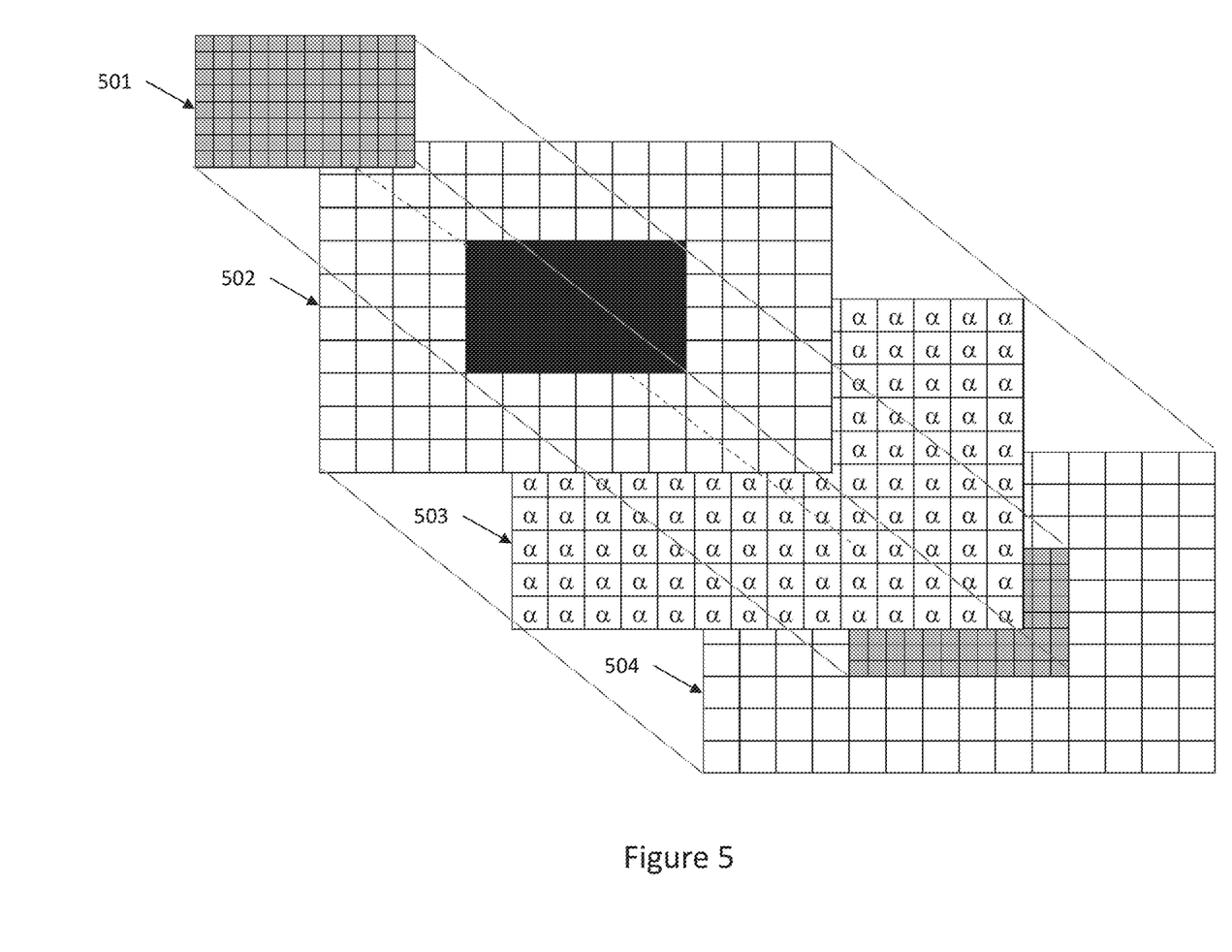
FIG. 5 is a block diagram illustrating alpha-blending between foveal and extra-foveal depth-planes to produce composite image for transmission to display panel(s), in accordance with an embodiment of the present disclosure.

FIG. 5 is a block diagram illustrating alpha-blending between foveal and extra-foveal depth-planes to produce composite image for transmission to display panel(s), in accordance with an embodiment of the present disclosure. As shown in FIG. 5, layer 502 comprises pixels in full resolution for the foveal region. Layer 504 comprises pixels in lower resolution for the extra-foveal region. In some embodiments, layer 502 and layer 504 overlap with each other. In other words, the foveal region is rendered with full resolution in layer 502 and with lower resolution in layer 504. In this embodiments, depth-planes for pixels in layer 502 are combined with depth-planes for pixels in layer 504 via alpha-blending 503 to produce image 501 to be transmitted to display panel(s). Such blending may enable a smooth-step transition such that an image comprising a foveal region and an extra-foveal region for a display panel is smoothly composited. Smoothstep is an interpolation function.

Figure 6:
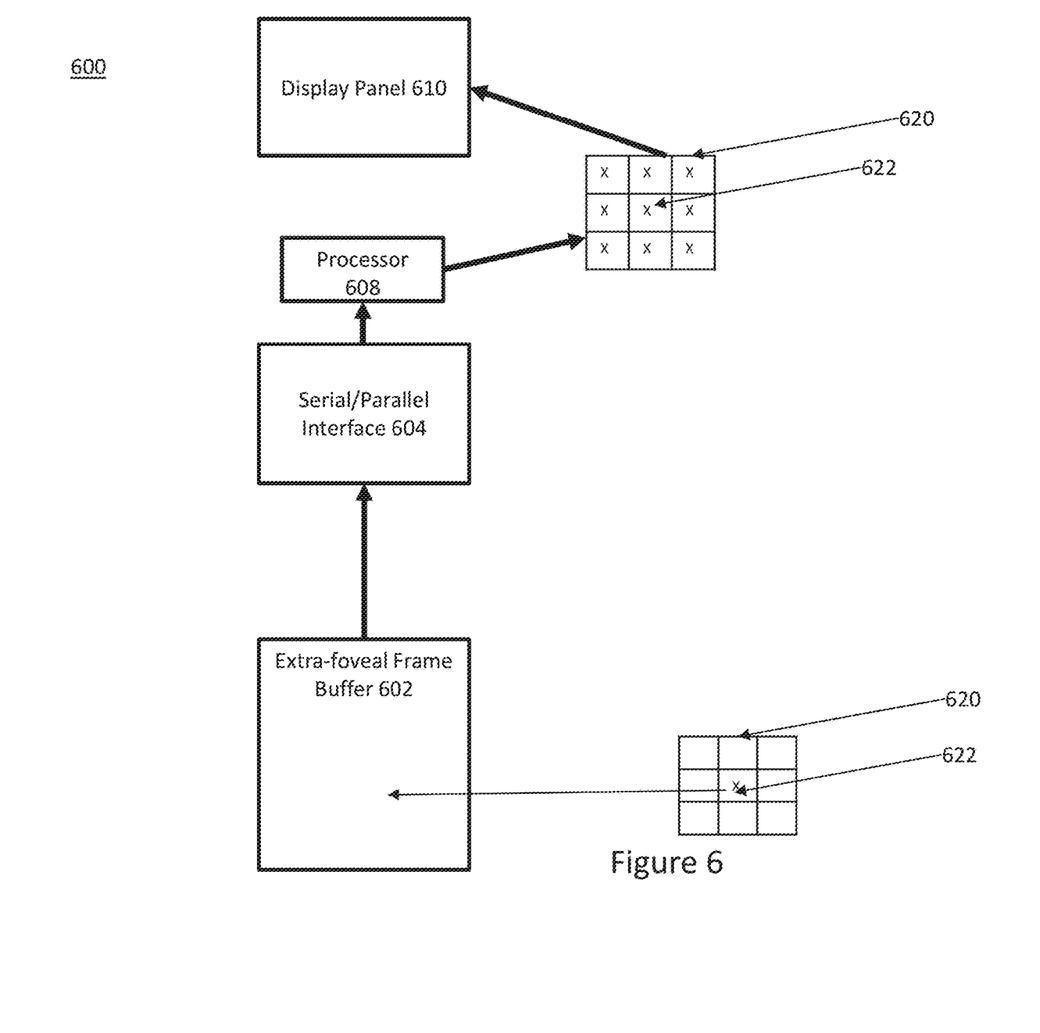
FIG. 6 is a block diagram illustrating data processing of the output of a Display Serial Interface, in accordance with an embodiment of the present disclosure.

FIG. 6 is a block diagram illustrating data processing of the output of a Display Serial Interface, in accordance with an embodiment of the present disclosure. In this embodiment, not all pixels that correspond to the extra-foveal region are loaded into the extra-foveal frame buffer 602. For example, for each 3×3 pixels 620, only one pixel value "x" for pixel 622 is loaded into the extra-foveal frame buffer 602. As another example, for each 2×2 pixels, 4×4 pixels, or 5×5 pixels, only one pixel value is loaded into the extra-foveal frame buffer. In some implementations, 2 or more pixels for each 2×2 pixels, 4×4 pixels, or 5×5 pixels may be loaded into the extra-foveal buffer. The pixel data/values are transmitted via serial/parallel interface 604 to display panel 610. The serial/parallel interface 604 may be a Display Serial Interface.

In some embodiments, processor 608 receives output for the serial/parallel interface 604. The process 608 may duplicate a pixel value to its neighbouring pixels. For example, as shown in FIG. 6, value "x" of pixel 622 may be duplicated to the neighbouring pixels 620, and the duplicated pixel values may be used to render an image on a display panel 610. Accordingly, not all pixels need to be stored in a memory. In other words, the memory only need to store a compressed representation of the image. For example, as shown in FIG. 6, if for each 3×3 pixels, only one pixel is loaded into the memory, the memory then only needs to store ⅑ of total pixels and 8 of 9 pixels for each 3×3 pixels may be duplicated by the processor 608.

Figure 7:
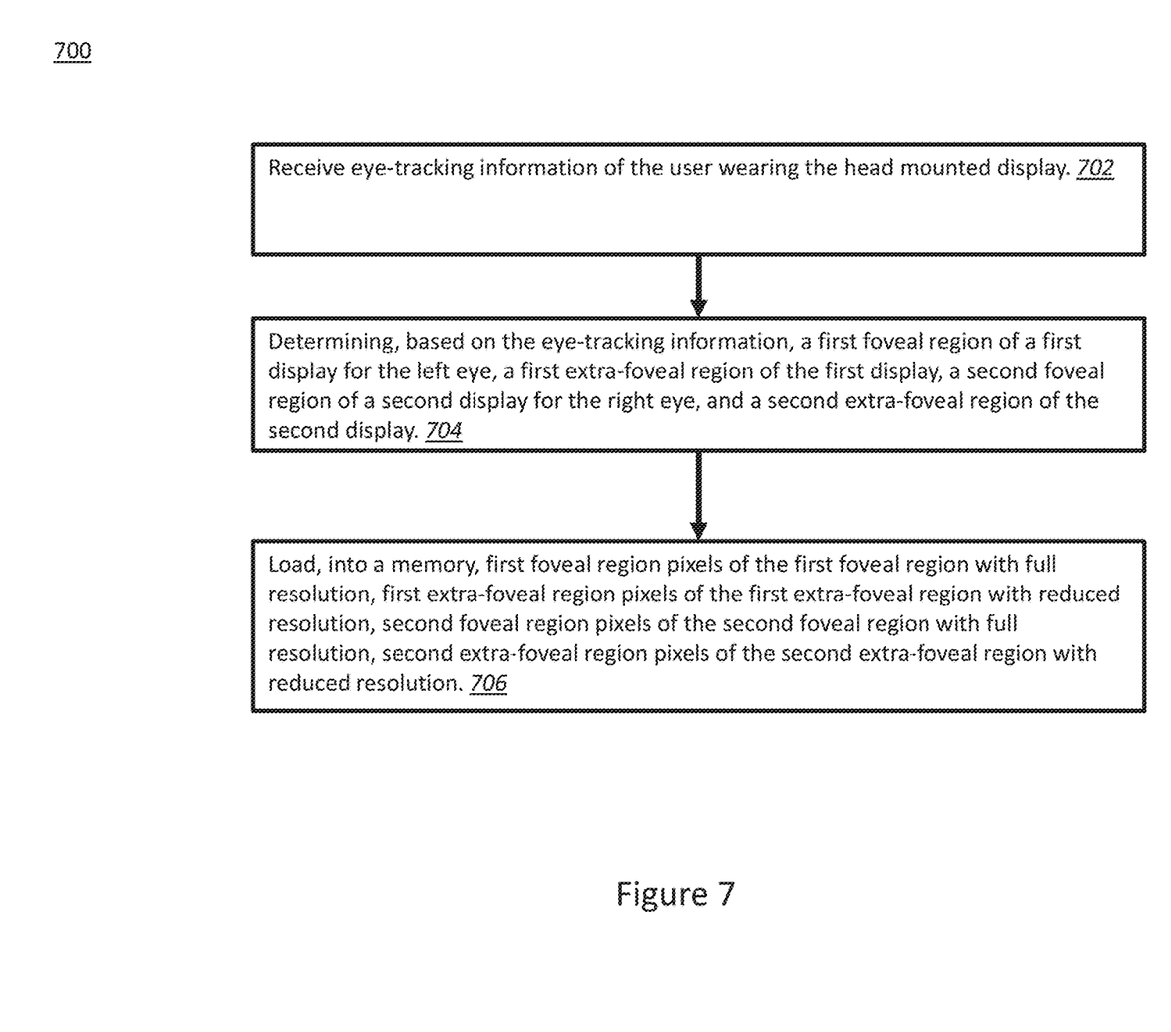
FIG. 7 shows a flowchart for graphical rendering in accordance with an embodiment of the present disclosure.

FIG. 7 shows a flowchart for graphical rendering in accordance with an embodiment of the present disclosure.

Method 700 may include receiving eye-tracking information of the user wearing the head-mounted display (702); determining, based on the eye-tracking information, a first foveal region of a first display for the left eye, a first extra-foveal region of the first display, a second foveal region of a second display for the right eye, and a second extra-foveal region of the second display (704); and load, into a memory, first foveal region pixels of the first foveal region with full resolution, first extra-foveal region pixels of the first extra-foveal region with reduced resolution, second foveal region pixels of the second foveal region with full resolution, second extra-foveal region pixels of the second extra-foveal region with reduced resolution (706).

Method 700 may include receiving eye-tracking information of the user wearing the head mounted display (702). In some implementations, as described above, the eye-tracking information may be based on infrared light projection onto user's pupils. In other implementations, the eye-tracking information may be based on EEG of the user (e.g., electrodes may be attached to the user's scalp, which then may send signals to a processor). In further implementations, eye tracking information may be obtained from special contact lens with an embedded mirror or magnetic field sensor that a user wears.

At step 704, based on the eye-tracking information, foveal and extra-foveal regions for the display panel for the user's left eye, and foveal and extra-foveal regions for the display panel of the user's right eye may be determined.

At step 706, pixels that correspond to foveal regions may be loaded into one or more foveal frame buffers and these pixels may be represented with full resolution; pixels that correspond to extra-foveal regions may be loaded into one or more extra-foveal frame buffers and these pixels may be represented with reduced resolution. As described above, the extra-foveal buffer may be shared between the display panel for the left eye and the display panel for the right eye. A pixel value may be duplicated across including but not limited to 2×2 pixels, 3×3 pixels, 4×4 panels, or 5×5 pixels. Other multiple pixels are possible. In some embodiments, the duplicated values may be stored in a frame buffer (e.g., an extra-foveal frame buffer). In other embodiments, the output of a Display Serial Interface may be processed to duplicate pixel values, which may enable compressed storage in a memory.

It will be appreciated that whilst several different arrangements have been described herein, that the features of each may be advantageously combined together in a variety of forms to achieve advantage.

In the foregoing specification, the application has been described with reference to specific examples. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

It is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word "comprising" does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A head-mounted display device comprising:
   a first display for a left eye;
   a second display for a right eye;

memory to store data to present via the first display and via the second display; and one or more processors to:

determine, based on eye-tracking information of a user wearing the head-mounted display, a first foveal region of the first display, a first extra-foveal region of the first display, a second foveal region of the second display, and a second extra-foveal region of the second display, the eye-tracking information representative of at least one of an eye movement or an eye position of the user;

identify a first subset of the data as corresponding to first foveal region pixels associated with the first foveal region, a second subset of the data as corresponding to first extra-foveal region pixels associated with the first extra-foveal region, a third subset of the data as corresponding to second foveal region pixels associated with the second foveal region, and a fourth subset of the data as corresponding to second extra-foveal region pixels associated with the second extra-foveal region;

load the first subset at a first full resolution from the memory to a first foveal frame buffer;

load the second subset at a first reduced resolution from the memory to a first extra-foveal frame buffer;

load the third subset at a second full resolution from the memory to a second foveal frame buffer; and load the fourth subset at a second reduced resolution from the memory to a second extra-foveal frame buffer.

2. The device of claim 1, further including at least one of an infrared light projector or an electroencephalograph (EEG) device to generate the eye-tracking information.

3. The device of claim 1, wherein the one or more processors are to adjust at least one of the first foveal region, the first extra-foveal region, the second foveal region, or the second extra-foveal region based on the eye-tracking information.

4. The device of claim 1, wherein the one or more processors are to duplicate a pixel value in a group of pixels across at least one of 2×2 pixels, 3×3 pixels, 4×4 pixels, or 5×5 pixels.

5. The device of claim 1, further including a Display Serial Interface in communication with the memory and in communication with at least one of the first display or the second display, the one or more processors to duplicate a pixel value after receiving the pixel value from the Display Serial Interface.

6. The device of claim 1, further including a first Display Serial Interface (DSI) associated with the first foveal frame buffer and a second DSI associated with the second foveal frame buffer, the first and second DSIs to transfer, in parallel, the data from the first foveal frame buffer and the second foveal frame buffer.

7. The device of claim 1, wherein the first extra-foveal frame buffer and second extra-foveal frame buffer are implemented as a shared extra-foveal frame buffer.

8. The device of claim 1, wherein the one or more processors are to:

load the first foveal frame buffer at a first rate;
load the first extra-foveal frame buffer at a second rate;
load the second foveal frame buffer at a third rate; and
load the second extra-foveal frame buffer at a fourth rate.

9. The device of claim 1, wherein the one or more processors are to apply alpha-blending (a) between depth-planes of the first foveal region pixels and depth-planes of the first extra-foveal region pixels and (b) between depth-planes of the second foveal region pixels and depth-planes of the second extra-foveal region pixels.

10. The device of claim 1, wherein the one or more processors is to duplicate at least one of (a) a first pixel value of the first foveal region to represent the first extra-foveal region pixels or (b) a second pixel value of the second foveal region to represent the second extra-foveal region pixels in the first reduced resolution or the second reduced resolution, respectively.

11. A method to present images to eyes of a user of a head-mounted display, the method comprising:

determining, by executing an instruction with at least one processor, based on eye-tracking information of the user wearing the head-mounted display, a first foveal region of a first display, a first extra-foveal region of the first display, a second foveal region of a second display, and a second extra-foveal region of the second display, the eye-tracking information representative of at least one of an eye movement or an eye position of the user;

identifying, by executing an instruction with the at least one processor, a first subset of data as corresponding to first foveal region pixels associated with the first foveal region, a second subset of the data as corresponding to first extra-foveal region pixels associated with the first extra-foveal region, a third subset of the data as corresponding to second foveal region pixels associated with the second foveal region, and a fourth subset of the data as corresponding to second extra-foveal region pixels associated with the second extra-foveal region;

loading, by executing an instruction with the at least one processor, the first subset at a first full resolution from a memory to a first foveal frame buffer;

loading, by executing an instruction with the at least one processor, the second subset at a first reduced resolution from the memory to a first extra-foveal frame buffer;

loading, by executing an instruction with the at least one processor, the third subset at a second full resolution from the memory to a second foveal frame buffer; and loading, by executing an instruction with the at least one processor, the fourth subset at a second reduced resolution from the memory to a second extra-foveal frame buffer.

12. The method of claim 11, further including generating the eye-tracking information with at least one of an infrared light projector or an electroencephalograph (EEG).

13. The method of claim 11, further including adjusting at least one of the first foveal region, the first extra-foveal region, the second foveal region, or the second extra-foveal region based on the eye-tracking information.

14. The method of claim 11, further including duplicating a pixel value after retrieving the pixel value from a Display Serial Interface in communication with a memory and at least one of the first display or the second display.

15. The method of claim 11, wherein the first extra-foveal frame buffer and the second extra-foveal frame buffer are implemented as a shared extra foveal frame buffer.

16. The method of claim 11, further including:

loading the first foveal frame buffer at a first rate;
loading the first extra-foveal frame buffer at a second rate;
loading the second foveal frame buffer at a third rate; and
loading the second extra-foveal frame buffer at a fourth rate.

17. The method of claim 11, further including applying alpha-blending (a) between depth-planes of the first foveal region pixels and depth-planes of the first extra-foveal region pixels and (b) between depth-planes of the second foveal region pixels and depth-planes of the second extra-foveal region pixels.

18. The method of claim 11, further including transferring from at least two Display Serial Interfaces, in parallel, the first subset at the first full resolution from the first foveal frame buffer to the first display, the second subset at the first reduced resolution from the first extra-foveal frame buffer to the first display, the third subset at the second full resolution from the second foveal frame buffer to the second display, and the fourth subset at the second reduced resolution from the second extra-foveal frame buffer to the second display.

19. For use with a head-mounted display device, a computer readable medium comprising instructions that, when executed, cause at least one processor to, at least:
   determine, based on eye-tracking information of a user wearing the head-mounted display, a first foveal region of a first display, a first extra-foveal region of the first display, a second foveal region of a second display, and a second extra-foveal region of the second display, the eye-tracking information representative of at least one of an eye movement or an eye position of the user;
   identify a first subset of data as corresponding to first foveal region pixels associated with the first foveal region;
   identify a second subset of the data as corresponding to first extra-foveal region pixels associated with the first extra-foveal region;
   identify a third subset of the data as corresponding to second foveal region pixels associated with the second foveal region;
   identify a fourth subset of the data as corresponding to second extra-foveal region pixels associated with the second extra-foveal region;
   load the first subset at a first full resolution from memory to a first foveal frame buffer;
   load the second subset at a first reduced resolution from the memory to a first extra-foveal frame buffer;
   load the third subset at a second full resolution from the memory to a second foveal frame buffer; and
   load the fourth subset at a second reduced resolution from the memory to a second extra-foveal frame buffer.

20. The method of claim 11, further including duplicating at least one of (a) a first pixel value of the first foveal region to represent the first extra-foveal region pixels or (b) a second pixel value of the second foveal region to represent the second extra-foveal region pixels in the first reduced resolution or the second reduced resolution, respectively.

* * * * *